US008320375B2

(12) United States Patent
Oertel

(10) Patent No.: US 8,320,375 B2
(45) Date of Patent: Nov. 27, 2012

(54) METHOD AND DEVICE FOR DISTRIBUTING DATA SEGMENT OF DATA STREAM TO GROUP OF USERS

(75) Inventor: Norbert Oertel, Landshut (DE)

(73) Assignee: Siemens Aktiengesellschaft, Munich (DE)

(*) Notice: Subject to any disclaimer, the term of this patent is extended or adjusted under 35 U.S.C. 154(b) by 118 days.

(21) Appl. No.: 12/449,585

(22) PCT Filed: Feb. 4, 2008

(86) PCT No.: PCT/EP2008/051351
§ 371 (c)(1),
(2), (4) Date: Aug. 14, 2009

(87) PCT Pub. No.: WO2008/098853
PCT Pub. Date: Aug. 21, 2008

(65) Prior Publication Data
US 2010/0098077 A1  Apr. 22, 2010

(30) Foreign Application Priority Data
Feb. 14, 2007 (DE) .......................... 10 2007 007 344

(51) Int. Cl.
*H04L 12/28* (2006.01)
(52) U.S. Cl. ........................................ 370/390; 370/400
(58) Field of Classification Search .................. None
See application file for complete search history.

(56) References Cited

U.S. PATENT DOCUMENTS

| 5,838,912 | A | * | 11/1998 | Poon et al. | 709/204 |
| 7,672,235 | B1 | * | 3/2010 | Lian et al. | 370/230 |
| 2003/0103521 | A1 | * | 6/2003 | Raphaeli et al. | 370/445 |
| 2005/0015431 | A1 | | 1/2005 | Cherkasova | |
| 2005/0021817 | A1 | | 1/2005 | Shimizu et al. | |
| 2007/0244894 | A1 | * | 10/2007 | St. Jacques | 707/9 |
| 2009/0106269 | A1 | * | 4/2009 | Zuckerman et al. | 707/10 |
| 2009/0300673 | A1 | * | 12/2009 | Bachet et al. | 725/31 |

FOREIGN PATENT DOCUMENTS

| EP | 1 643 716 A1 | 4/2006 |
| WO | 2004/100493 A1 | 11/2004 |
| WO | 2005/036818 A1 | 4/2005 |

OTHER PUBLICATIONS

Schulzrinne et al.; "RTP—A Transport for Real-Time Application"; RFC 1889, Internet Engineering Task Force; Jan. 1996; pp. 1-74.
International Search Report for Application No. PCT/EP2008/051351; mailed Jun. 12, 2008.

* cited by examiner

*Primary Examiner* — Otis L Thompson, Jr.
(74) *Attorney, Agent, or Firm* — Staas & Halsey LLP

(57) ABSTRACT

A status message is sent by each node a group of nodes in a network to other nodes in the group using a multicast and/or broadcast channel of the network to identify the nodes in the group. The status message includes a piece of information about a data segment to be received by the nodes in the group via the multicast and/or broadcast channel. At least one of the nodes in the group requests the data segment via a point-to-point transmission channel from a source node. The data segment is sent to the other node(s) in the group via the multicast and/or broadcast channel.

13 Claims, 2 Drawing Sheets

METHOD AND DEVICE FOR DISTRIBUTING DATA SEGMENT OF DATA STREAM TO GROUP OF USERS

CROSS REFERENCE TO RELATED APPLICATIONS

This application is the U.S. national stage of International Application No. PCT/EP2008/051351, filed Feb. 4, 2008. The International Application claims the benefit of German Application No. 10 2007 007 344.7 filed on Feb. 14, 2007. Both applications are incorporated by reference herein in their entirety.

BACKGROUND

As a result of the introduction of digitization and the internet, data such as e.g. pieces of music or feature films is being transmitted to an increasing extent in digitized form over distribution networks, such as e.g. the internet, to the respective end customers. A plurality of solutions exist which can be used for distributing the data or data streams.

Thus, with the aid of a centralized infrastructure the data stream can be routed by a broadcaster to a multimedia server which has a network link to the end customers and is responsible for forwarding the data stream to the end customers. In this case, where there is a large number of end customers, a hierarchical distribution scheme can be deployed with the aid of a plurality of multimedia servers in order to be able thereby to distribute the load and avoid imposing too heavy a load on a core network. A centralized infrastructure of the kind has the disadvantage that it is expensive to build and costly to maintain.

Another approach involves building overlay structures with and without distribution trees, which at least partially get by without a centralized infrastructure. Known methods are, for example, relaying methods via P2P networks (P2P—Peer2Peer), such as e.g. PeerCast. A disadvantageous aspect in this case is that the leaves of the distribution trees thus built make no further contribution to the broadcasting, i.e. to the distribution of the data stream. In this case the leaves represent out-and-out consumers. In a development of the overlay structures the data streams are split up into substreams, and the substreams are distributed by way of overlay structures, such as e.g. in a method by the name of SplitStream (see RFC 1889, "RTP—A Transport Protocol for Real-Time Applications", Internet Engineering Task Force (IETF), at www.ietf.org.

The result of this extension is that all the nodes can be an internal node in one of the distribution trees and thus contribute bandwidth for overall distribution purposes. A disadvantageous aspect in this case, however, is maintaining the distribution trees, since complexity and susceptibility to faults are great due to the decentralized distribution of the tree structures, while a reorganization of the distribution trees in the event of a failure is costly and time-consuming and bridging failures by failover protection measures is difficult to implement since maintenance at the individual distribution trees is not centrally coordinated.

SUMMARY

Aspects include a method, a user device and a system which enable data segments of a data stream to be distributed in a decentralized manner while imposing only a slight load on a distribution network.

The method for distributing at least one data segment of at least one data stream to a group of a plurality of users in a network includes the following:

sending a status message by the at least one user to the at least one other user of the group by a multicast and/or broadcast channel of the network, the status message including information which indicates that the sending user wishes to receive at least one data segment that is to be received of the data stream;

receiving at least one further status message of the at least one other user of the group by the user via the multicast and/or broadcast channel, the status message including information which indicates that the sending other user wishes to receive at least one data segment that is to be received of the data stream;

receiving the data segment by the user via a point-to-point transmission channel from a source node;

determining by the user whether, based on its status message, at least one of the other users has indicated to the user its wish to receive the received data segment;

sending the data segment to the at least one identified other user by the multicast and/or broadcast channel;

receiving the data segment by the at least one identified other user via the multicast and/or broadcast channel.

The method enables the group of users to be formed and changed dynamically. In this case, even if connections within the network are not functioning correctly and/or users are not functioning correctly, reliable distribution of the data segment or data segments can be guaranteed. Furthermore, the method requires no centralized administration, so it can be implemented easily and cost-effectively. The method can also be deployed in an existing network even when it is only supported by some of the users, since it can be used autonomously in relation to other existing streaming and/or download methods.

After the desired data segment has been received by one of the users of the group, the user transmits the received desired data packet to the other users via the multicast and/or broadcast channel. In this way the desired data segment is transmitted only twice in the network of the users, i.e. the first time in order to be received by the user and the second time in order to be distributed to the other users of the group. As a result a bandwidth requirement can be limited to a twice-only transmission of the desired data segment in the distribution network, using the multicast and/or broadcast channel and the point-to-point transmission channel. If each of the n users were to request the desired data segment independently from the source node, the data segment would be transmitted n times in the distribution network.

If, before sending a request message to the source node for the data segment to be transferred, the user checks whether the data segment is present as a result of having been received via the multicast and/or broadcast channel and sends the request message only if the check identifies the data segment as missing, a requesting of the data segment can be prevented if the data segment is already present with the user. Bandwidth in the network is saved as a result. Furthermore, a latency time between requesting and further processing of the data segment can be reduced, since a time delay due to repeated transmission of the data segment is eliminated.

Furthermore, the transmission of a data segment received via the point-to-point transmission channel by the multicast and/or broadcast channel can be prevented if the received data segment has also been received via the multicast and/or broadcast channel. In this case a further reduction in the required bandwidth in the multicast and/or broadcast channel is achieved, since the data segment will only be sent if it has not yet been received by other users of the group.

The sending of the status message by the respective user to the at least one other user by the multicast and/or broadcast channel may be carried out at time intervals that can be predefined for the users individually. In this way it is ensured that the group of users can respond dynamically to changes, such as users joining the group and leaving the group. The time intervals can be predefined for each user and/or chosen randomly. For example, an algorithm is known from RFC 1889 which is used to calculate the time interval between two succeeding RTCP packets (RTCP—RTP Control Protocol; RTP—Realtime Transport Protocol).

In an extension, the respective request message for the respective user is sent based on a predefinable or randomly determinable time delay the time delay can also be determined starting from a predefinable start time (STP). Thus, the respective request messages of the users are sent at different times; it can be achieved as a result of this that one of the users of the group has already received the requested data segment and forwards it to the other users of the group before the other users send their respective request message, i.e. before their time delay has elapsed. The bandwidth requirement in the network is reduced further by this extension. Moreover, the sending of the request message can be inhibited if the requested data segment has reached the other user by the multicast and/or broadcast channel.

The method may be implemented by a user device in a network, the user device having the following:
  a transmitter for sending a status message by the at least one user to the at least one other user of the group by a multicast and/or broadcast channel of the network, the status message including information which indicates that the sending user wishes to receive at least one data segment that is to be received of the data stream, and for sending the data segment to the at least one identified other user by the multicast and/or broadcast channel;
  a receiver for receiving at least one further status message of the at least one other user of the group by the user via the multicast and/or broadcast channel, the status message including information which indicates that the sending other user wishes to receive at least one data segment that is to be received of the data stream, and for receiving the data segment by the at least one identified other user via the multicast and/or broadcast channel;
  a selection unit for determining whether, based on its status message, at least one of the other users has indicated to the user its wish to receive the received data segment.

Furthermore, the user device can include further unit(s) with the aid of which extensions of the method can be implemented.

The method may be implemented by a system having a group of users and a source node, wherein the source node has a source which is embodied in such a way that it performs the method and optionally its extensions with the aid of at least one user device.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
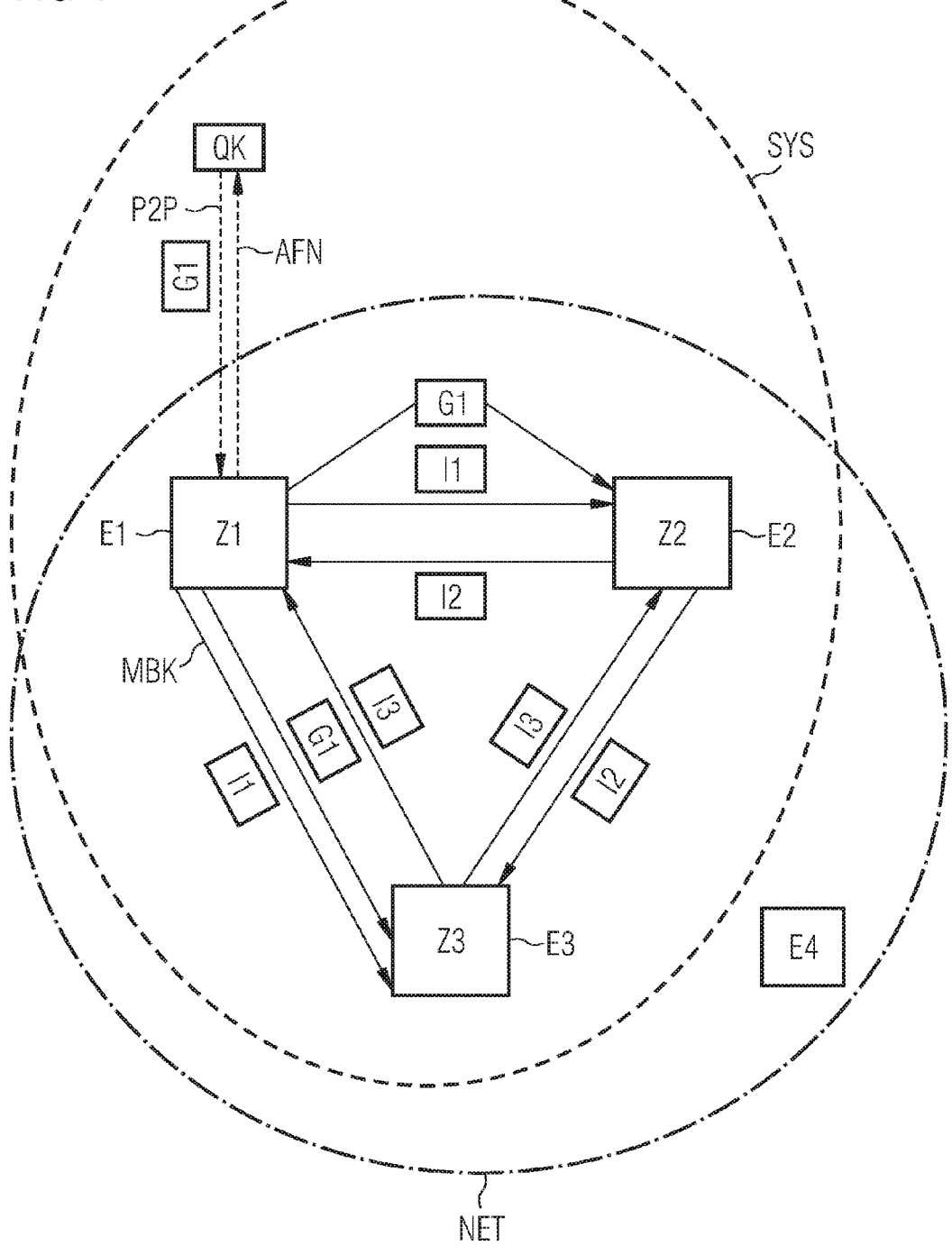
FIG. 1 is a block diagram of a network having a group of three users performing the method for distributing at least one data segment.

Reference will now be made in detail to the preferred embodiments, examples of which are illustrated in the accompanying drawings, wherein like reference numerals refer to like elements throughout.

FIG. 1 shows a network NET with four nodes E1, E2, E3, E4 and a source node QK which are connected to one another via data communication links, such as e.g. LAN (LAN—Local Area Network), for the purpose of mutually exchanging data (the links are not shown in FIG. 1). FIG. 1 depicts the source node QK which includes data segments G1, G2, G3 of at least one data stream D, the data segments being provided for downloading for one or more nodes. The nodes E1, E2, E3 wish to download the data segments of the data stream from the source node and for that purpose form a group G. In order to differentiate the nodes from all nodes of the network, the nodes E1, E2, E3 are referred to hereinafter as users E1, E2, E3.

The data stream D is present in the form of data segments on the source node QK and can be downloaded from there segment by segment. The downloading of the segments is achieved by the respective user in that a request message AFN is sent in the form of a point-to-point connection P2P, i.e. via a point-to-point transmission channel, to the source node which, after receiving the request message, sends one of the data segments G1 of the data stream D via the point-to-point transmission channel to the requesting user. Data segments and messages that are sent via the point-to-point transmission channel are designated by dashed lines in FIG. 1.

Before the request message AFN is sent by one of the users E1, E2, E3, the users each send their status message I1 to the other users of the group G. Thus, the user E1 transmits its status message I1 to the users E2, E3, the user E2 transmits its status message I2 to the users E1, E3, and the user E3 transmits its status message I3 to the users E1, E2. The respective status message indicates that the respective user wishes to receive the data stream D or, more specifically, the associated data segments. After receiving the status messages, the users E1, E2, E3 are in the picture as to which of the other nodes or users in the network NET currently wish to receive the data stream or, more specifically, the data segments. The status messages are sent via a multicast and/or broadcast channel MBK.

It should be noted at this juncture that as a result of being sent via the broadcast and/or multicast channel the status message initially reaches all the nodes in the network. Only those nodes that also wish to receive data segments make a note of this status information and are therefore one of the users in the group. This means that the group is built up and can be changed dynamically, since users of the group can leave it and other nodes in the network can join the group by sending their status message and by receiving the status message of the at least one user of the group.

Next, the user E1 requests a data segment G1 from the source node QK with the aid of the request message AFN. The source node thereupon transmits the data segment G1. After receiving the data segment G1, the user E1 selects those other users of the group that have transmitted their status message to it in such a way as to indicate that they wish to receive data segments of the data stream. In this way the users E2 and E3 are identified.

The user E1 subsequently transmits the data segment G1 to the selected users E2, E3 via the multicast and/or broadcast channel MBK of the network NET. The users E2, E3 thereupon receive the data segment G1 via the multicast and/or broadcast channel.

In order to prevent the user receiving the data segment G1 both directly from the source node QK via the point-to-point transmission channel P2P and from another user via the multicast and/or broadcast channel MBK, prior to sending the request message the respective user checks whether the required data segment has already been received via the multicast and/or broadcast channel MBK. If this is the case, no request message will be sent by the user; if it is not, the request message is sent. What is achieved is that data traffic within the network is reduced, since the desired data segment is transmitted once via the peer-to-peer transmission channel to one of the users of the group and relayed by the latter to the other users of the group with the aid of the multicast and/or broadcast channel of the network. As a result a network load within the network is restricted to a twice-only transmission of the data segment.

The method according to FIG. 1 permits every user to receive the data segment from the source node and to distribute it further to the other users of the group. The user responsible for the distribution within the network can therefore change over time. This ensures that on the one hand a self-organizing distribution of the data segment of the data stream within the network is made possible, which self-organizing distribution is not only flexibly adaptable to take account of dynamic changes, such as e.g. users joining or leaving the group, but can also be implemented cost-effectively, since no centralized administration is required. Furthermore, this approach is robust with regard to faults, since an incorrectly operating user, e.g. a failed user, cannot obstruct the distribution of the data segments within the group.

The method can be extended in that the status message is distributed at predefinable time intervals Z1, Z2, Z3 by one user to the other users or nodes in the network. Thus, the user E1 sends its status messages in the time interval Z1 and the user Z2 sends its status messages in its assigned time interval Z2. Shorter time intervals are necessary if the network is characterized by highly dynamic behavior, e.g. due to users joining or leaving the group. If a composition of the users in the group remains stable for a relatively long time, the respective time interval selected can be increased, for example Z1=4 seconds, Z2=8 seconds, Z3=30 seconds.

In an alternative extension the sending of the respective request message AFN of the respective user E1, E2, E3 can be controlled based on a predefinable or randomly determinable time delay ZV. This will be explained in more detail with reference to FIGS. 2a and 2b. In order to reduce the volume of traffic required in the network NET for distributing the data segment G1 it is desirable if only one of the users of the group receives the data segment via the point-to-point transmission channel and sends the received data segment to the other users of the group by the multicast and/or broadcast channel. In order to achieve this, the time Tx, such as e.g. T1, T2 or T3, at which the request message of the respective users E1, E2, E3 is sent, is controlled with the aid of a respective time delay ZV. Accordingly, the time delay ZV first determines the time T1, T2, T3 at which the request message for the respective user is to be sent, i.e. for the user E1 at time T1, the user E2 at time T2, and the user E3 at time T3. The rule in the example according to FIG. 2a is T1<T2<T3, e.g. T1=15:00:00 hours, T2=15:00:15 hours and T3=15:01:11 hours.

First, the user E1 sends its request message AFN (E1) to the source node at time T1, the source node transmitting the data segment G1 to the user E1 at a further time T1'=15:00:05. Following reception of the data segment, the user E1 transmits the received data segment to the other users E2, E3 of the group. Before the other users E2, E3 now send their request messages AFN(E2) and AFN(E3), they check whether they have already received the desired data segment. As this is the case, the users E2, E3 forgo sending their request message. In FIG. 2a, those request messages that are not sent are indicated graphically by dotted lines.

Figure 2A:
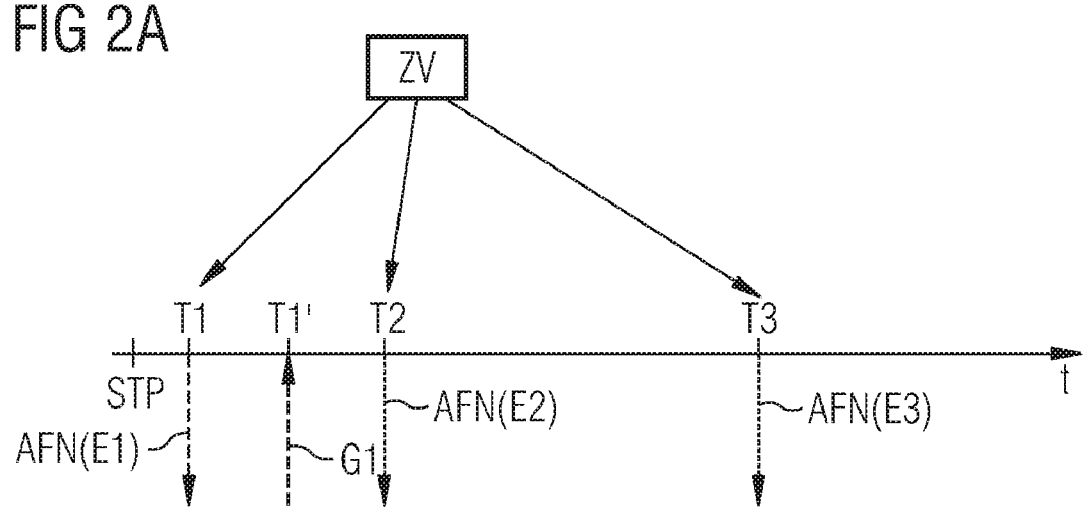
FIGS. 2a and 2b are timing diagrams depicting respective representations having different time delays for sending a respective request message to a source node.
Figure 2B:
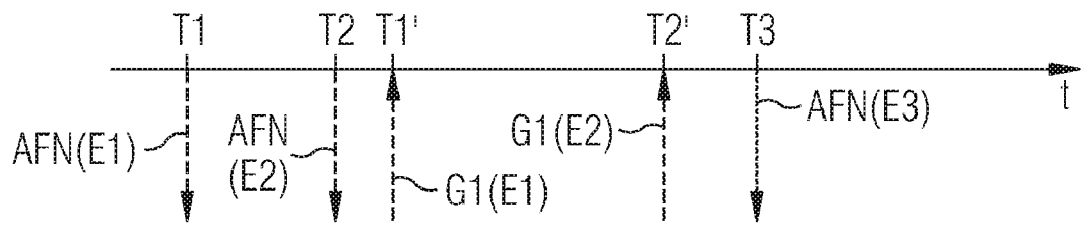

In FIG. 2b, analogously to the explanations given in relation to FIG. 2a, the times T1, T2, T3 are specified. Thus, the user E1 first sends its request message AFN(E1) to the source node. Since the user E2 does not have the desired data segment G1 at its time T2, it transmits its request message AFN (E2) to the source node. Following thereon in time, the user E1 receives the data segment G1(E1) at time T1', and the user E2 receives the data segment G1(E2) at time T2' (the parentheses in the reference signs of FIGS. 2a and 2b are to be understood simply as a pointer indicating to which or from which user a message is sent or a data segment received).

After the data segment has been received by the user E1, the latter checks whether the data segment G1 has been received by the multicast and/or broadcast channel. As that is not the case, the user E1 transmits the data segment to the other users E2, E3 of the group G via the multicast and/or broadcast channel. In addition, after receiving the data segment via the point-to-point transmission channel, i.e. directly from the source node QK, the user E2 checks whether the data segment has already been received via the multicast and/or broadcast channel. Since this is the case, the user E2 no longer sends the data segment via the multicast and/or broadcast channel.

The method can be performed by user devices operated by the users E1, E2, E3 of the group in the network NET, with the operations performed by the user devices and/or the source node implemented and realized by software and/or hardware. For example, a user device may be a computer unit, such as a PDA (PDA—Personal Digital Assistant) or a mobile phone. In this case the end nodes have the following:

- a transmitter for sending a status message by the at least one user to the at least one other user of the group by a multicast and/or broadcast channel of the network, the status message including information which indicates that the sending user wishes to receive at least one data segment that is to be received of the data stream, and for sending the data segment to the at least one identified other user by the multicast and/or broadcast channel;
- a receiver for receiving at least one further status message of the at least one other user of the group by the user via the multicast and/or broadcast channel, the status message including information which indicates that the sending other user wishes to receive at least one data segment that is to be received of the data stream, and for receiving the data segment by the at least one identified other user via the multicast and/or broadcast channel;
- a selection unit for determining whether, based on its status message, at least one of the other users has indicated to the user its wish to receive the received data segment.

Furthermore, the user device can include further unit(s) with the aid of which extensions of the method can be implemented.

The group of users and the source node can also be combined in the form of a system, the source node having a source which is embodied in such a way that it performs the method for distributing and its extensions with the aid of at least one user device.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for distributing at least one data segment of at least one data stream to a group of nodes in a network via a multicast and/or broadcast channel, comprising:
    sending at least one first status message by at least one receiving node to requesting nodes of the group via the multicast and/or broadcast channel of the network, the at least one first status message including information which indicates that the at least one receiving node wishes to receive at least one data segment of the data stream;
    receiving at least one second status message from at least one requesting node by the at least one receiving node via the multicast and/or broadcast channel at time intervals predefined for the nodes individually, the at least one second status message including second information which indicates that the at least one requesting node wishes to receive the at least one data segment that is to be received in the data stream via the multicast and/or broadcast channel;
    receiving the at least one data segment by the at least one receiving node via a point-to-point transmission channel from a source node;
    determining by the at least one receiving node based on the at least one second status message, that at least one of the requesting nodes has indicated to the at least one receiving node a desire to receive the at least one data segment via the multicast and/or broadcast channel;
    sending the at least one data segment to the requesting nodes via the multicast and/or broadcast channel;
    receiving the at least one data segment by the requesting nodes via the multicast and/or broadcast channel.

2. The method as claimed in claim 1, further comprising:
    checking at the at least one requesting node, before sending a request message to the source node for the at least one data segment, whether the at least one data segment is present as a result of having been received via the multicast and/or broadcast channel; and
    sending the request message only if said checking determines that the at least one data segment is missing.

3. The method as claimed in claim 1, further comprising preventing said sending of the at least one data segment received via the point-to-point transmission channel, if the at least one data segment has also been received via the multicast and/or broadcast channel.

4. The method as claimed in claim 3, wherein each of the at least one second status message from each of the at least one requesting node is sent based on one of a predefinable and randomly determinable time delay, starting from a predefined start time.

5. A node communicating with other nodes in a group of nodes via a network having a source node, a point-to-point transmission channel and a multicast and/or broadcast channel, comprising:
    a transmitter sending a first status message to the other nodes of the group via the multicast and/or broadcast channel of the network, the first status message including first information indicating that said node wishes to receive at least one data segment that is to be received in a data stream, and selectively sending the at least one data segment to the other nodes of the group via the multicast and/or broadcast channel when the at least one data segment is received by said node via the point-to-point transmission channel from the source node;
    a receiver receiving a second status message from at least one other node of the group via the multicast and/or broadcast channel, the second status message including information indicating that the at least one other node wishes to receive the at least one data segment, receiving the at least one data segment via the point-to-point transmission channel from the source node when the at least one data segment is sent to said node via the point-to-point transmission channel by the source node, and receiving the at least one data segment via the multicast and/or broadcast channel when one of the at least one other node receives the at least one data segment via the point-to-point transmission channel from the source node;
    a selection unit making a determination, based on the second status message, that the at least one other node has indicated that the at least one data segment is desired by the at least one other node, said transmitter sending the at least one data segment to the other nodes via the multicast and/or broadcast channel based on the determination.

6. The node as claimed in claim 5,
    further comprising a checking unit checking whether the at least one data segment is present at the node as a result of having been received via the multicast and/or broadcast channel, before sending a request message to the source node for the at least one data segment, and
    wherein said transmitter sends the request message only if said checking unit determines that the at least one data segment is not present.

7. The method as claimed in claim 5, wherein said transmitter is prevented from sending of the at least one data segment received via the point-to-point transmission channel, if the at least one data segment has also been received via the multicast and/or broadcast channel.

8. The node as claimed in claim 7, wherein the first status message is sent by said transmitter to the at least one other node via the multicast and/or broadcast channel at a time interval predefined for the node.

9. The node as claimed in claim 7, wherein the first status message is sent by said transmitter based on one of a predefinable and randomly determinable time delay, starting from a predefined start time.

10. A system, comprising:
    a network having a point-to-point transmission channel and a multicast and/or broadcast channel;
    a source node of at least one data segment in a data stream; and
    user nodes forming a group of at least three nodes by each of said user nodes transmitting to each other of said user nodes in the group, via the multicast and/or broadcast channel at time intervals predefined for said user nodes individually, a status message including information indicating a desire to receive the at least one data segment, one of said user nodes requesting the at least one data segment from said source node via the point-to-point transmission channel and sending the at least one data segment to all other of said user nodes via the multicast and/or broadcast channel upon receipt of the at least one data segment from said source node, based on the information in the status message received from all other of said user nodes.

11. The system as claimed in claim 10, wherein the one of said user nodes checks whether the at least one data segment is present as a result of having been received via the multicast and/or broadcast channel, before sending a request message to said source node for the at least one data segment, and sends the request message only if it is determined that the at least one data segment is not present.

12. The system as claimed in claim 10, wherein the one of said user nodes is prevented from sending of the at least one data segment received via the point-to-point transmission channel, if the at least one data segment has also been received via the multicast and/or broadcast channel.

13. The system as claimed in claim 12, wherein the status message is sent by each of said user nodes to each other said user nodes via the multicast and/or broadcast channel based on one of a predefinable and randomly determinable time delay, starting from a predefined start time.

* * * * *